United States Patent
Siebels et al.

[11] Patent Number: 5,997,077
[45] Date of Patent: Dec. 7, 1999

[54] DEFORMABLE STRUCTURE FOR PROTECTION OF VEHICLE OCCUPANTS

[75] Inventors: Johann Siebels, Wolfsburg; Knut Schmidt, Wasbüttel, both of Germany

[73] Assignee: Volkswagen AG, Wolfsburg, Germany

[21] Appl. No.: 09/135,688

[22] Filed: Aug. 18, 1998

[30] Foreign Application Priority Data

Aug. 23, 1997 [DE] Germany .......................... 197 36 839

[51] Int. Cl.⁶ .................................. B60J 7/00; B60J 5/06
[52] U.S. Cl. ....................... 296/189; 296/146.6; 296/188; 49/502
[58] Field of Search .................................. 296/188, 189, 296/146.6; 49/502

[56] References Cited

U.S. PATENT DOCUMENTS

| | | | |
|---|---|---|---|
| 4,742,899 | 5/1988 | Thornton | 296/189 |
| 4,838,606 | 6/1989 | Furubayashi et al. | 296/146.6 |
| 4,948,196 | 8/1990 | Baba et al. | 296/188 |
| 4,969,680 | 11/1990 | Shimoda | 49/502 |
| 5,306,066 | 4/1994 | Sahthoff . | |
| 5,306,068 | 4/1994 | Nakae et al. . | |
| 5,435,619 | 7/1995 | Nakae et al. . | |
| 5,531,500 | 7/1996 | Podvin | 296/188 |
| 5,595,415 | 1/1997 | Beaulet | 49/502 |
| 5,871,253 | 2/1999 | Erber | 296/146.6 |

FOREIGN PATENT DOCUMENTS

| | | | |
|---|---|---|---|
| 21191 | 1/1983 | European Pat. Off. . | |
| 495715 | 7/1992 | European Pat. Off. . | |
| 710578 | 5/1996 | European Pat. Off. . | |
| 2529842 | 6/1983 | France . | |
| 2524633 | 11/1976 | Germany . | |
| 2729089 | 6/1977 | Germany . | |
| 2917687 | 11/1980 | Germany . | |
| 3038252 | 5/1982 | Germany . | |
| 3621697 | 1/1988 | Germany . | |
| 3925821 | 8/1990 | Germany . | |
| 4005624 | 6/1991 | Germany . | |
| 4340346 | 6/1995 | Germany . | |
| 4340347 | 6/1995 | Germany . | |
| 4340349 | 6/1995 | Germany . | |
| 0045421 | 2/1991 | Japan | 296/188 |
| 404063720 | 2/1992 | Japan | 296/146.6 |
| 405058349 | 3/1993 | Japan | 296/188 |
| 406106978 | 4/1994 | Japan | 296/146.6 |

*Primary Examiner*—Joseph D. Pape
*Assistant Examiner*—Kiran Patel
*Attorney, Agent, or Firm*—Baker & Botts, L.L.P.

[57] ABSTRACT

A deformable structure for occupant protection in vehicles has hollow energy-absorbing elements which are disposed between walls or other components. The hollow bodies are tube portions which are predeformed perpendicularly to their longitudinal axes and which are disposed with the tube axes parallel to the walls individually in a predeterminable arrangement or joined together in single-layer or multilayer fashion, and wherein the degree of predeformation is between 0.1% and 85% of the open width of the undeformed tube in the direction of the deformation impact force.

10 Claims, 2 Drawing Sheets

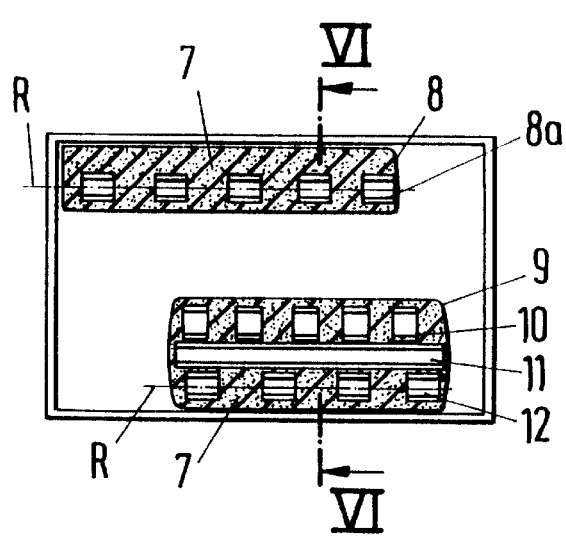
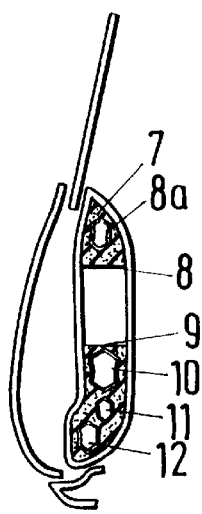
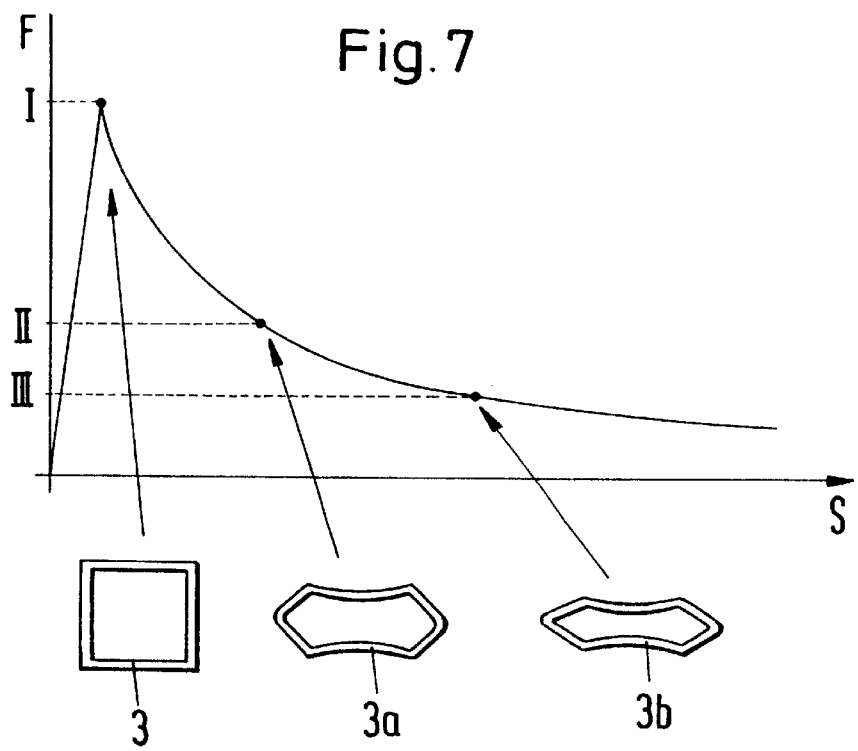

DEFORMABLE STRUCTURE FOR PROTECTION OF VEHICLE OCCUPANTS

BACKGROUND OF THE INVENTION

The invention relates to deformable structures for protection of vehicle occupants in particular for direct protection of occupants of a vehicle passenger compartment.

Because of the progressively more stringent vehicle safety requirements, use is made of deformable structures for cushioning arrangements in vehicle passenger compartments. In particular, foams and honeycombs having energy-absorbing properties are provided to reduce the risk of injury or the severity of injuries in the event of an impact because, while maintaining a maximum permissible impact-resisting force, such materials absorb as much kinetic energy as possible and thereby reduce the impact stresses.

Resilient foam materials absorb impact energy up to a certain level and then return the stored energy in the opposite direction. This leads to undesirably high reaction speeds.

Solid plastic foam materials absorb impact energy in the course of the compression of the pores and cells in a satisfactory manner, but only until the cells are completely compressed, leading to a "solid material" condition which produces an excessive increase in impact-resisting force and is not capable of further absorption of energy.

For occupant-protecting energy absorption, it is necessary to achieve a particular force/deformation path characteristic of the deformable element, by which a defined maximum permissible impact-resisting force is not exceeded upon commencement of the deformation, the impact resisting force being maintained over a deformation path which is as long as possible and which substantially corresponds to the thickness of the undeformed deformable element so that the function of the deformable element as an energy absorbing component is preserved and the impact force applied to it is not transmitted in its full magnitude to a vehicle occupant. In order to ensure adequate energy absorption by the deformable element, an excessive increase in impact-resisting force, a so-called force peak, must not occur at the start of the deformation, and the deformation should take place over the entire deformation path at a force level close to, but below the maximum permissible impact-resisting force.

Deformable elements and deformable structures in the form in which they are described in the following prior art documents attempt to provide solutions to this problem.

U.S. Pat. No. 3,989,275 describes a vehicle door having an energy-absorbing cushioning cladding formed as a molded part containing a synthetic, rigid plastic foam with a plurality of molded-on projections, such as ribs, columns or cones, formed on the side remote from a vehicle occupant with a layer of a force-distributing semi-stiff plastic foam disposed on the same side of the cladding as the vehicle occupant compartment.

Deformable structures having energy-absorbing ceramic deformable elements are also known. Thus, German Patent No. 29 17 687 discloses a deformable element which has an energy-absorbing core containing a filling of mineral particulate foams, in particular spherical expanded clay, expanded silicate or expanded slate particles, the volume of which is filled with a foam material, the core being surrounded by a resilient jacket. German Offenlengungsschrift No. 43 40 346 discloses a deformable structure which is made of structured ceramic or framework ceramic embedded in a plastic foam, i.e. a spatial pattern of plastic filaments or plastic lattices. Furthermore, German Offenlengungsschrift No. 43 40 347 describes a beam for motor vehicles which is at least partially filled with a multiplicity of ceramic hollow bodies abutting its inner wall which, when acted upon by a force, become deformed with controlled folding in the direction of the major dimension of the beam. By selecting appropriate ceramic hollow bodies, it is possible to create a coordinated deformation behavior of the beam. In this connection, the use of larger and/or thin-walled hollow bodies provides a longer deformation path, while smaller and/or thicker-walled hollow bodies have a higher capacity to absorb impact forces.

A deformable element made from ceramic hollow bodies of differing diameter and differing wall thickness is described in German Offenlengungsschrift No. 43 40 349. The hollow bodies, preferably hollow spheres of aluminum oxide, are arranged in such a way that those having a relatively large wall thickness and having a greater energy absorption capacity are disposed at the front, on the force application side, and those having a large diameter or a small wall thickness to achieve a greater path length at a lower level of force are disposed behind them with respect to the direction of applied impact force.

The subject of European Application No. 0 530 042 is a vehicle door having a door body containing an impact cushion which is an integral composite structure having an arrangement of mutually parallel elongate foam elements, the axes of which are disposed transversely to the door cladding. U.S. Pat. No. 5,306,066 also describes a vehicle door having an inner and an outer body sheet and having a deformable structure at the inner body sheet which is designed in the form of a honeycomb, the cell-forming walls of which are aligned substantially transversely to the inner body sheet.

In the statement of the prior art in German Patent No. 36 21 697, horizontally disposed tubes or shaped members constructed of a homogeneous material are mentioned as energy-absorbing impact-resisting structures. To improve the specific reshaping capacity of such tubes or shaped members, reinforcement is provided by a tension strap and a compression strap. In this case, the reinforcing elements have cavity-forming elements which are disposed with their longitudinal axes perpendicular to the tension strap and to the compression strap.

Finally, German Patent No. 30 38 252 describes an impact-absorbing deformable element for the knee impact region of a driver and a front seat passenger which is formed from a plurality of tubes extending parallel to each other with the tube axes extending transversely to the direction of impact.

To a greater or lesser extent, limits are set for the above-described arrangements with respect to satisfying the above-mentioned force/deformation path characteristic requirements. In particular, the deformable structure is compressed after a short deformation path and then behaves like a solid material, resulting in an excessive increase in impact-resisting force.

SUMMARY OF THE INVENTION

Accordingly, it is an object of the present invention to provide a deformable structure for protecting vehicle occupants which overcomes disadvantages of the prior art.

Another object of the invention is to provide a deformable structure in which, by using simple deformable elements, an excessive increase in impact-resisting force upon commencement of the deformation is avoided and a deformation path is provided which is as long as possible and which substantially corresponds to the thickness of the deformable structure, in order to reduce the risk of injury to a vehicle occupant impacting the deformable structure.

These and other objects of the invention are attained by providing a deformable structure having metal tube portions which are predeformed in a radial direction with respect to the tube axes and which are mounted with the tube axes parallel to the impact receiving walls of the components with which they are operatively associated. In this arrangement, the radially predeformed tube portions can be joined together individually or in predetermined arrangements relative to each other in single-layer or in multilayer fashion. The force/deformation path characteristic can be predetermined for each individual predeformed tube portion and for the composites joined together in single-layer and multilayer fashion from predeformed tube portions, and also the maximum permissible impact-resisting force up to which the deformable structure is able to absorb energy can also be predetermined. The characteristic of each individual tube portion is dependent not only upon the predeformation but also upon the material, the internal diameter or width, the wall thickness and the wall geometry and the length of the tube portion.

With several tube portions connected as composites, further relevant factors are the number of connected tube portions, the spacing and the arrangement of the tube portions and the method of joining them. However, it has been found that, when the extent of the predeformation of the individual tube portion employed in the deformable structure is in the range from 0.1 to 85% of original tube diameter or width, an impact-resisting force peak does not occur upon commencement of the deformation as long as a predetermined maximum impact force is not exceeded as energy is introduced. When an impact force and corresponding deformation energy is introduced into the deformable element, the deformation of the predeformed tube portion is, for practical purposes, continued without the occurrence of an excessive increase in impact-resisting force. In this case, the deformation path is long and, with individually disposed tube portions, the path substantially corresponds to the internal open width of the tubes. When the tube portions are joined together in single-layer or multi layer fashion, the deformation path is somewhat smaller than the total of the internal open widths since the tube walls disposed parallel to the direction of the impact force are buckled in the course of the deformation and are pushed between the tube walls disposed transversely to the direction of the impact force.

As a result of this avoidance of a "force peak", the risk of injury to a vehicle occupant impacting the deformable structure is reduced.

The tube portions may be produced from quadrilateral tube shapes, in particular from square tubes. The degree of tube predeformation is preferably at least 20% of the open internal width of the tubes in the impact direction. The tube portions may be oriented differently so that the force is introduced either through a tube side or through a tube corner, so that differing characteristics can be established with the same tube parameters. In addition, the tube corner radius can be varied in a controlled fashion.

The deformable structures can also be formed by a single-layer or multilayer combination of tubes of differing internal open widths or/and differing wall thicknesses of the same or different materials.

When tube portions are arranged in multilayer fashion, each layer can be made from tube portions having parameters which are different from those of the tube portions of another layer in order to generate a defined change in impact-resisting force over the deformation path. Thus, it can be advantageous to form the layer on the impact force-receiving side from tube portions having a greater wall thickness than a layer disposed behind that layer in the direction of the impact force, or to form the layer on the force introduction side from tube portions having a smaller internal open width.

To improve the energy-absorbing properties, the tube portions can be combined additionally with other energy-absorbing structures. For example, they can be foamed out, filled and/or embedded in foam.

It is advantageous if the single-layer or multilayer composites of tube portions are joined by processes which do not alter the properties of the individual tube portions, for example by adhesive bonding.

By way of an alternative to this, single- or multilayer composites of tube portions can be produced from portions of integrally drawn, extrusion-molded or extruded tube shapes.

BRIEF DESCRIPTION OF THE DRAWINGS

Further objects and advantages of the invention will be apparent from a reading of the following description in conjunction with the accompanying drawings, in which:

FIG. 5 is a longitudinal sectional view through a door showing the arrangement of different deformable structures for a door cushion;

FIG. 6 is a cross-sectional view taken on the line VI—VI of FIG. 5; and

FIG. 7 is a graphical representation showing impact force level/predeformation path characteristics for tubular members having a rectangular cross-section.

DESCRIPTION OF PREFERRED EMBODIMENTS

Figure 1:
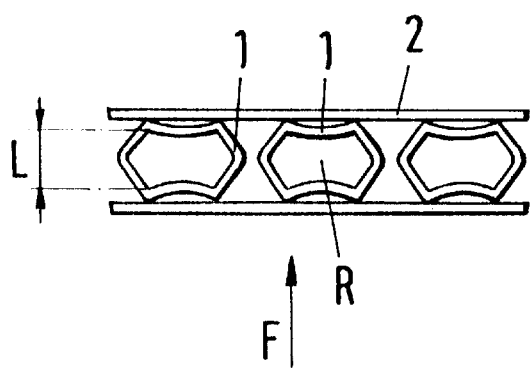
FIG. 1 is a cross-sectional view showing a representative embodiment of a deformable structure according to the invention having individual spaced tube portions with a quadrilateral shape.

In the typical embodiment shown in FIG. 1, a deformable structure is formed from individual steel tube portions 1 which have a quadrilateral shape and are spaced from each other between two metal sheets 2. In this arrangement, the tube axis R of each tube portion 1 extends parallel to the metal sheets 2. The tube portions 1 have been predeformed by applying a force perpendicular to their longitudinal axis, with an extent of deformation of 35% with respect to an undeformed rectangular tube portion. With this arrangement, when impact energy is introduced in the direction of the arrow F, an excessive increase in force, a so-called force peak, does not occur. Instead, the tube portions 1 are deformed, after reaching a force level determined by their parameters, at substantially the same force level over the entire deformation path, which corresponds approximately to the inner side length L of the tube portions. Only at the end of the deformation part, i.e. when the open internal width of the tube portions 1, which corresponds to the side length, is reduced to zero, does the impact-resisting force rise steeply.

In FIG. 7 the initial impact-resisting force level, i.e. the force level which occurs at the commencement of the deformation of a deformable element, is represented as a function of the extent of the deformation of a square tube. In the case of a square tube 3, which is formed from a cylindrical tube portion and which is not predeformed, this force level is initially at the level I. In the case of the square tube 3a which has been initially deformed, the initial impact-resisting force has fallen to the level II, and in the case of the square profile 3b having a greater extent of predeformation, the initial impact-resisting force has fallen to the level III. This illustration demonstrates how the impact-resisting force level with which the deformation is initiated is altered by the extent of the predeformation. In any case, in the examples shown, the remaining deformation paths decrease with the extent of predeformation.

Figure 2:
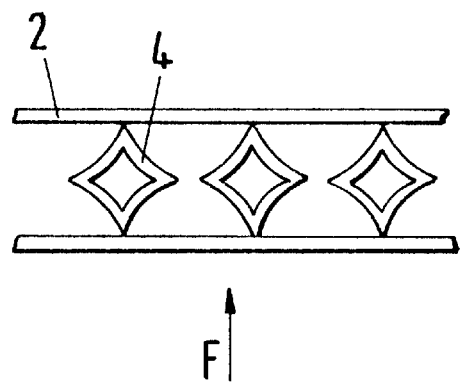
FIG. 2 is a cross-sectional view showing a further embodiment of a deformable structure, likewise having tube portions with a quadrilateral shape.

FIG. 2 shows another deformable structure having tube portions 4 with a quadrilateral shape and in which the direction of introduction of the impact force in the course of the deformation is rotated by 45° as compared with the tube portions shown in FIG. 1. In this deformable structure, the direction of introduction of the force differs by 45° with respect to the orientation of the deformed tube walls, and the result is a different force/deformation path characteristic.

Figure 3:
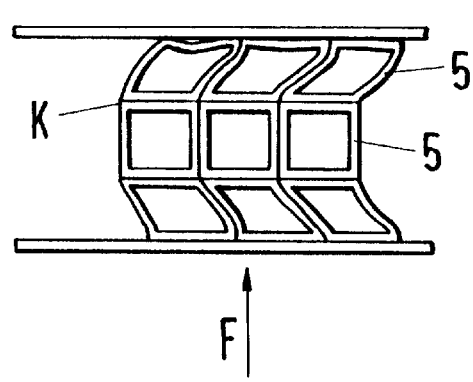
FIG. 3 is a cross-sectional view showing a three-layer deformable structure.

FIG. 3 shows a deformable structure with steel tube portions 5 which are joined together in three layers. The tube portions in two of the layers are predeformed in the same way and to the same extent. The tube portions 5 have adhesive bonds K along their abutting surfaces.

Figure 4:
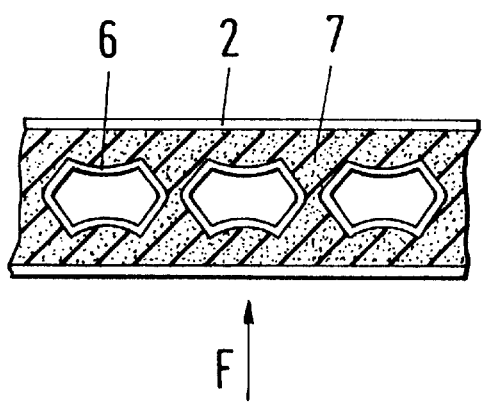
FIG. 4 is a cross sectional view showing a deformable structure containing individual spaced tube portions having a quadrilateral shape suspended by a foam.

FIG. 4 shows a deformable structure formed from a combination of predeformed tube portions 6 and synthetic solid plastic foam 7. The plastic foam 7 distributes the impact energy applied to this structure and reduces the initial impact-resisting force level. An advantage of this deformable structure is also that it can be prefabricated as a deformable component.

FIGS. 5 and 6 show a vehicle door containing deformable components 8 and 9. These components have differing deformable structures. While the upper deformable component 8 is formed from a series of predeformed tube portions 8a which are spaced in the tube axis direction R and which are embedded in a plastic foam 7, the lower component 9 has a structure in which three layers of predeformed tube portions 10, 11 and 12 are disposed one above the other and are embedded in a plastic foam 7. The upper layer is formed from individual tube portions 10 which are spaced from each other, the central layer is made from a continuous tube portion 11 and the lower layer is made from spaced tube portions 12. The cross-sectional shape of the tube section differs from layer to layer as shown in FIG. 6. This structure is relatively costly, but it demonstrates the multiplicity of possibilities for combination and thus the universal nature of the deformable structure according to the invention.

Although the invention has been described with reference to specific embodiments, many modifications and variations therein will readily occur to those skilled in the art. Accordingly, all such variations and modifications are included with the intended scope of this invention.

We claim:

1. A deformable structure for occupant protection in vehicles comprising a plurality of hollow bodies disposed between vehicle walls wherein the hollow bodies are tube portions which are predeformed in a direction perpendicular to their axes to cause the tube portions to absorb by deformation the energy of an impact applied in a direction transverse to the axes of the tube portions while avoiding an initial peak in impact resisting force and which are disposed with the tube axes parallel to the vehicle walls and wherein the degree of predeformation is between 0.1% and 85% of the open width of an undeformed tube in the direction of impact application.

2. A deformable structure according to claim 1 wherein the tube portions have quadrilateral shapes.

3. A deformable structure according to claim 1 wherein the degree of predeformation of the tube portions is at least 20%.

4. A deformable structure according to claim 1 comprising a plurality of tube portions having different open widths and/or differing wall thickness and are of the same or different materials.

5. A deformable structure according to claim 1 wherein the plurality of tube portions is joined together in multilayer fashion and wherein a layer on an impact force-receiving side is formed from tube portions having a greater wall thickness than a layer disposed behind that layer in the direction of application of the impact force.

6. A deformable structure according to claim 1 wherein the tube portions are joined together in multilayer fashion and a layer on the impact force-receiving side is formed from tube portions having a smaller open width than a layer disposed behind that layer with respect to the direction of the action of the impact force.

7. A deformable structure according to claim 1 wherein the tube portions are combined with other energy absorbing elements.

8. A deformable structure according to claim 1 wherein single-layer or multilayer composites of tube portions are connected to each other by a process which does not affect the deformation properties of the tube portions.

9. A deformable structure according to claim 8 wherein the tube portions are joined by adhesive bonding.

10. A deformable structure according to claim 1 wherein the tube portions are in single-layer or multilayer composites produced from portions of integrally drawn, extrusion-molded or extruded shapes.

* * * * *